(12) United States Patent
Cho et al.

(10) Patent No.: US 11,704,374 B2
(45) Date of Patent: Jul. 18, 2023

(54) SYSTEMS AND METHODS FOR PERSONALIZING SEARCH ENGINE RECALL AND RANKING USING MACHINE LEARNING TECHNIQUES

(71) Applicant: Walmart Apollo, LLC, Bentonville, AR (US)

(72) Inventors: Hyun Duk Cho, San Francisco, CA (US); Sushant Kumar, Sunnyvale, CA (US); Kannan Achan, Saratoga, CA (US); Nimesh Sinha, San Jose, CA (US); Aysenur Inan, Mountain View, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 224 days.

(21) Appl. No.: 17/163,400

(22) Filed: Jan. 30, 2021

(65) Prior Publication Data

US 2022/0245209 A1 Aug. 4, 2022

(51) Int. Cl.
*G06F 16/9535* (2019.01)
*G06F 16/9532* (2019.01)
(Continued)

(52) U.S. Cl.
CPC ...... *G06F 16/9535* (2019.01); *G06F 16/9532* (2019.01); *G06N 20/00* (2019.01);
(Continued)

(58) Field of Classification Search
CPC ........... G06Q 30/0201; G06Q 30/0625; G06Q 30/0633; G06Q 30/0631; G06Q 10/067;
(Continued)

(56) References Cited

U.S. PATENT DOCUMENTS

| | | | |
|---|---|---|---|
| 7,113,917 B2 | 9/2006 | Jacobi et al. | |
| 9,361,387 B2 * | 6/2016 | Dumais | G06F 16/9537 |

(Continued)

OTHER PUBLICATIONS

GoodWorkLabs, "How Machine Learning Can Help You Understand Your Customers Better," accessed Jan. 27, 2021 at https://www.goodworklabs.com/how-machine-learning-can-help-you-understand-your-customers-better/; published Dec. 26, 2016; 5 pgs. Dec. 26, 2016.

*Primary Examiner* — Etienne P Leroux
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform acts of: providing a search engine that includes, or communicates with, a recall personalization model configured to generate personalized recall sets of search results for users; receiving, at the search engine, a search query submitted by a user; generating, using the recall personalization module, a feature vector for the user that includes contextual features associated with the user; generating, using the recall personalization model, a simulated narrowing query that includes the search query submitted by the user and the feature vector; generating, using the search engine, a recall set of search results based, at least in part, on the simulated narrowing query. Other embodiments are disclosed herein.

20 Claims, 10 Drawing Sheets

(51) Int. Cl.
*G06Q 30/0601* (2023.01)
*G06Q 30/0201* (2023.01)
*G06N 20/00* (2019.01)
*G06Q 10/067* (2023.01)

(52) U.S. Cl.
CPC ....... *G06Q 10/067* (2013.01); *G06Q 30/0201* (2013.01); *G06Q 30/0625* (2013.01); *G06Q 30/0631* (2013.01); *G06Q 30/0633* (2013.01)

(58) Field of Classification Search
CPC .. G06F 16/9535; G06F 16/9532; G06N 20/00
See application file for complete search history.

(56) References Cited

U.S. PATENT DOCUMENTS

| | | | | |
|---|---|---|---|---|
| 9,990,639 | B1* | 6/2018 | Kong | G06Q 50/16 |
| 2009/0063475 | A1* | 3/2009 | Pendse | G06F 21/6245 |
| | | | | 707/999.005 |
| 2009/0070326 | A1* | 3/2009 | Kraft | G06Q 10/10 |
| | | | | 707/999.005 |
| 2010/0318391 | A1* | 12/2010 | Gvirtsman | G06Q 10/06 |
| | | | | 705/7.39 |
| 2013/0080208 | A1* | 3/2013 | Wang | G06Q 30/0201 |
| | | | | 705/7.32 |
| 2013/0191374 | A1* | 7/2013 | Aravamudan | H04N 21/4524 |
| | | | | 707/722 |
| 2014/0220195 | A1* | 8/2014 | Kohn | G01N 33/0001 |
| | | | | 426/650 |
| 2014/0304106 | A1 | 10/2014 | Dahan | |
| 2017/0046394 | A1* | 2/2017 | Skidanov | G06F 16/2379 |
| 2017/0098236 | A1* | 4/2017 | Lee | G06Q 10/067 |
| 2020/0151201 | A1* | 5/2020 | Chandrasekhar | G06F 16/2246 |
| 2020/0192951 | A1* | 6/2020 | Singhal | G06F 16/9535 |
| 2020/0341976 | A1* | 10/2020 | Aggarwal | G06N 3/08 |
| 2020/0372069 | A1* | 11/2020 | Pearlman | G06F 16/9566 |
| 2020/0380168 | A1* | 12/2020 | Klinkigt | G06V 20/52 |
| 2020/0401639 | A1* | 12/2020 | Kussmaul | G06F 16/3349 |
| 2021/0034969 | A1* | 2/2021 | Wayne | G06N 3/0445 |
| 2021/0241397 | A1* | 8/2021 | Norelius | G06Q 20/02 |
| 2021/0374772 | A1* | 12/2021 | Wagner | G06N 7/005 |
| 2022/0180401 | A1* | 6/2022 | Roy Chowdhury | G06F 16/24578 |
| 2022/0198487 | A1* | 6/2022 | Zhong | G06N 3/0454 |

\* cited by examiner

300

- 401– Storage Module(s)
  - 330– Electronic Platform
    - 410– Database(s)
      - 310–Items
        - 415–Attributes
      - 315–Item Type Categories
      - 311– Historical Data
        - 412– Session Data
    - 350– Machine Learning Architecture
      - 360– Recall Personalization Model
        - 461– Attribute Key Selection Model(s)
        - 462– Statistical Model(s)
        - 463– Contextual Features
          - 464– Attribute Keys
        - 420–Personalization Preferences
          - 465– Preference Scores
        - 480– Feature Vector
      - 370– Personalized Ranking Model
    - 390– Search Engine
      - 320– Search Queries
        - 321– Generic Queries
        - 322– Simulated Narrowing Queries
      - 380– Search Results
        - 381– Recall Set
        - 382– Personalized Search Results 402– Processing Module(s)

FIG. 4

370– Personalized Ranking Model

- 510– Explicit Learning Model
  - 515–Affinity Scores

- 520– Implicit Learning Model
  - 521– Natural Language Learning Model
  - 522– Attribute-Item Pairs
  - 525– Similarity Scores
  - 515–Affinity Scores

- 530– Importance Model
  - 535– Importance Scores

- 540– Item Preference Scores

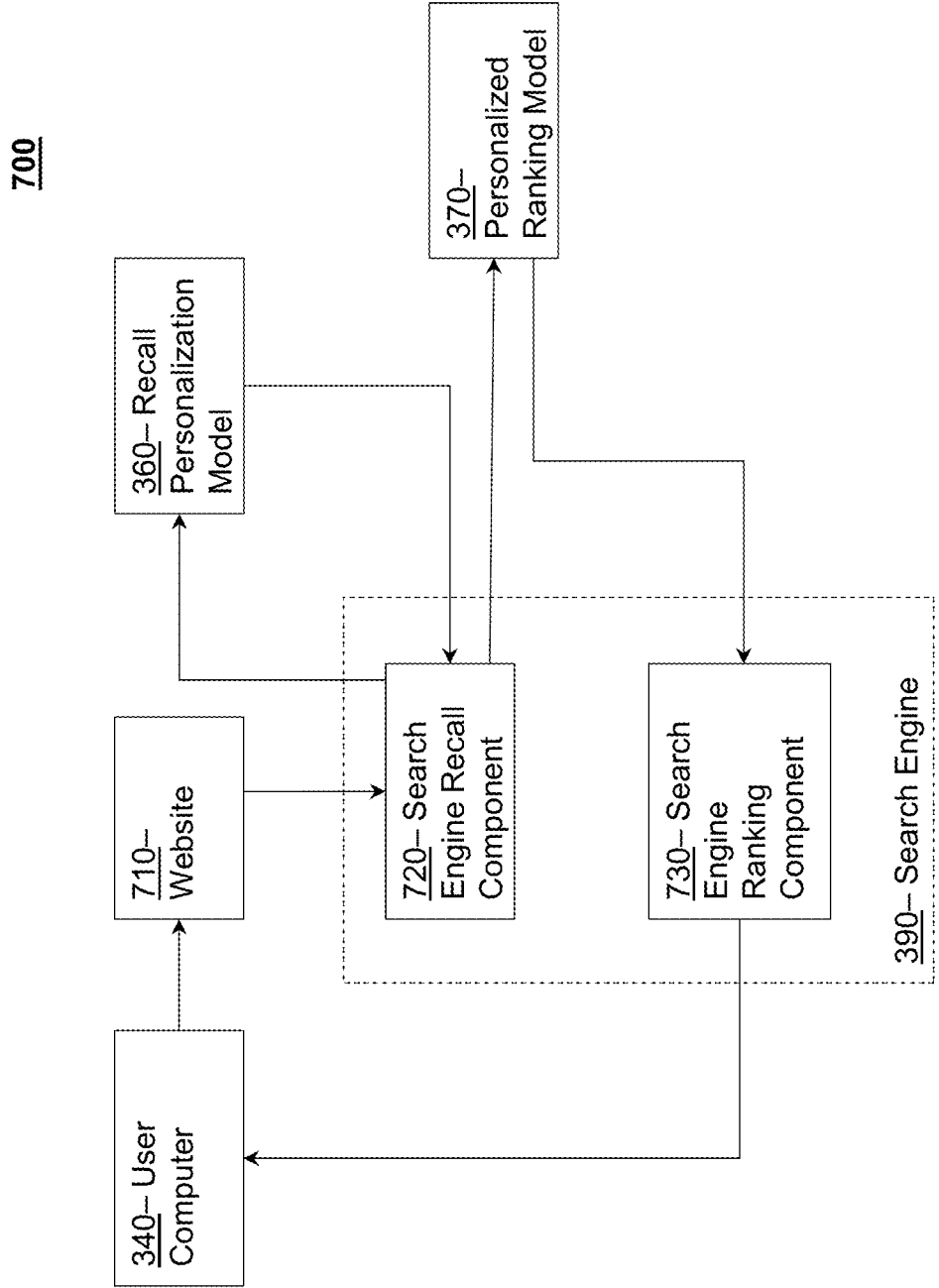

800

810 – Providing a search engine that includes, or communicates with, a recall personalization model configured to generate recall sets of search results based, at least in part, on personalization preferences of users

↓

820 – Receiving, at the search engine, a search query submitted by a user

↓

830 – Generating, using the recall personalization module, a feature vector for the user that includes contextual features indicating the personalization preferences associated with the user

↓

840 – Generating, using the recall personalization model, a simulated narrowing query that includes the search query submitted by the user and the feature vector that includes the contextual features

↓

850 – Generating, using the search engine, a recall set of search results based, at least in part, on the simulated narrowing query,

910– Providing a search engine that includes, or communicates with, a machine learning architecture configured to sort or order search results for items based, at least in part, on personalization preferences of users 920– Generating attribute affinity scores for one or more attributes that predict a user's affinity for attribute values associated with the one or more attributes 930– Generating an importance score for each of the one or more attributes that predicts an importance of each of the one or more attributes to the user 940– Generating, using the search engine, personalized search results that are ordered based, at least in part, on the attribute affinity scores and attribute importance scores

FIG. 9

SYSTEMS AND METHODS FOR PERSONALIZING SEARCH ENGINE RECALL AND RANKING USING MACHINE LEARNING TECHNIQUES

TECHNICAL FIELD

This disclosure relates generally to machine learning architectures that personalize search results for users.

BACKGROUND

Many electronic platforms permit users to browse, view, purchase, and/or order items (e.g., products and/or services) via the electronic platforms. In many cases, the electronic platforms offer a large selection (e.g., thousands or millions) of items, and a search engine included on the electronic platforms permits the users to search for desired items. Users may submit queries (e.g., text strings) to the search engines to search for the desired items.

Typically, search engines return the same set of search results to users for a given search query. For example, if user A and user B both submit a query for "boots," both users will receive the same set of search results, and the search results will be ordered in the same manner.

Users commonly submit generic queries to the search engine in attempting to identify a desired item. For example, users commonly submit generic queries which identify an item type category (e.g., "Yogurt" or "boots") without including narrowing descriptors that identify attributes (e.g., brands, flavors, sizes, etc.) associated with desired items. In these scenarios, the desired items are unlikely to appear at the top of the search results, and users are forced to sift through a long listing of search results in attempting to identify the desired items. In many cases, users will abandon their search for desired items, and will forego ordering the desired items, when the desired items are not presented near the top of the search results or on a first page of search results.

BRIEF DESCRIPTION OF THE DRAWINGS

To facilitate further description of the embodiments, the following drawings are provided in which:

FIG. 4 illustrates a representative block diagram of a portion of the system of FIG. 3 according to certain embodiments;

FIG. 5A illustrates a representative block diagram of a portion of the systems of FIGS. 3 and 4 according to certain embodiments;

FIG. 7 illustrates a representative flow diagram for personalizing search results according to certain embodiments;

FIG. 8 illustrates a flowchart for a method according to certain embodiments; and FIG. 9 illustrates a flowchart for a method according to certain embodiments.

Figure 1:
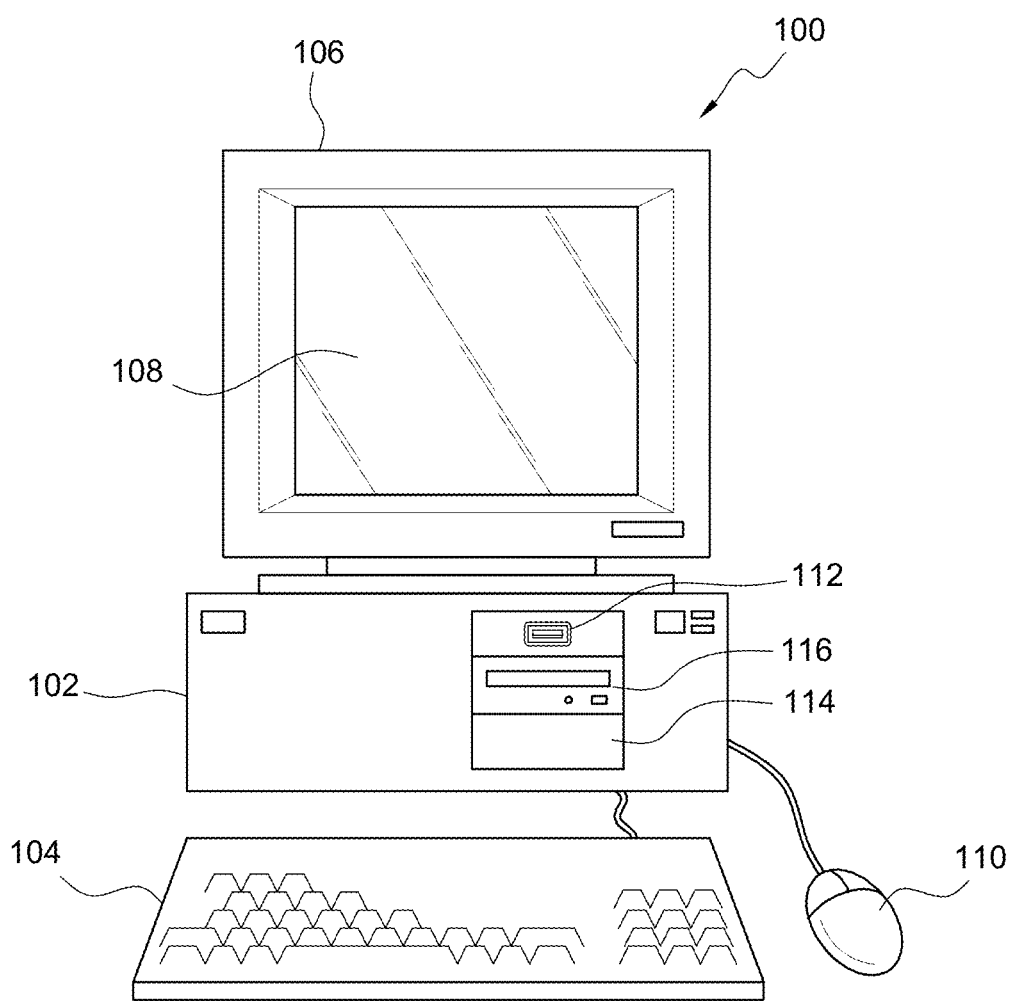
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform acts of: providing a search engine that includes, or communicates with, a recall personalization model configured to generate personalized recall sets of search results for users; receiving, at the search engine, a search query submitted by a user; generating, using the recall personalization module, a feature vector for the user that includes contextual features associated with the user, the contextual features indicating personalization preferences associated with the user; generating, using the recall personalization model, a simulated narrowing query that includes the search query submitted by the user and the feature vector that includes the contextual features; and generating, using the search engine, a recall set of search results based, at least in part, on the simulated narrowing query, wherein the recall set of search results accounts for the personalization preferences associated with the user.

Various embodiments include a method. The method can be implemented via execution of computing instructions configured to run at one or more processors and configured to be stored at non-transitory computer-readable media. The method can comprise: providing a search engine that includes, or communicates with, a recall personalization model configured to generate personalized recall sets of search results for users; receiving, at the search engine, a search query submitted by a user; generating, using the recall personalization module, a feature vector for the user that includes contextual features associated with the user, the contextual features indicating personalization preferences associated with the user; generating, using the recall personalization model, a simulated narrowing query that includes the search query submitted by the user and the feature vector that includes the contextual features; and generating, using the search engine, a recall set of search results based, at least in part, on the simulated narrowing query, wherein the recall set of search results accounts for the personalization preferences associated with the user.

Another system can include one or more processors and one or more non-transitory computer-readable storage devices storing computing instructions. The computing instructions can be configured to run on the one or more processors and perform acts of: providing a search engine that includes, or communicates with, a machine learning architecture configured to assist the search engine with sorting or ordering search results for one or more items based, at least in part, on personalization preferences of users; generating, using a personalized ranking model of the machine learning architecture, one or more attribute affinity scores for one or more attributes associated with an item type category, wherein the one or more attribute affinity scores predict a user's affinity for attribute values associated with the one or more attributes; generating, using the personalized ranking model of the machine learning architecture, a respective attribute importance score for each of the one or more attributes, the respective attribute importance score predicting a respective importance of each of the one or more attributes to the user; and generating, using the search engine, personalized search results that are ordered based, at least in part, on the one or more attribute affinity scores and the respective attribute importance scores.

Another method can be implemented via execution of computing instructions configured to run at one or more processors and configured to be stored at non-transitory computer-readable media The method can comprise: providing a search engine that includes, or communicates with, a machine learning architecture configured to assist the search engine with sorting or ordering search results for one or more items based, at least in part, on personalization preferences of users; generating, using a personalized ranking model of the machine learning architecture, one or more attribute affinity scores for one or more attributes associated with an item type category, wherein the one or more attribute affinity scores predict a user's affinity for attribute values associated with the one or more attributes; generating, using the personalized ranking model of the machine learning architecture, a respective attribute importance score for each of the one or more attributes, the respective attribute importance score predicting a respective importance of each of the one or more attributes to the user; and generating, using the search engine, personalized search results that are ordered based, at least in part, on the one or more attribute affinity scores and the respective attribute importance scores.

Figure 2:
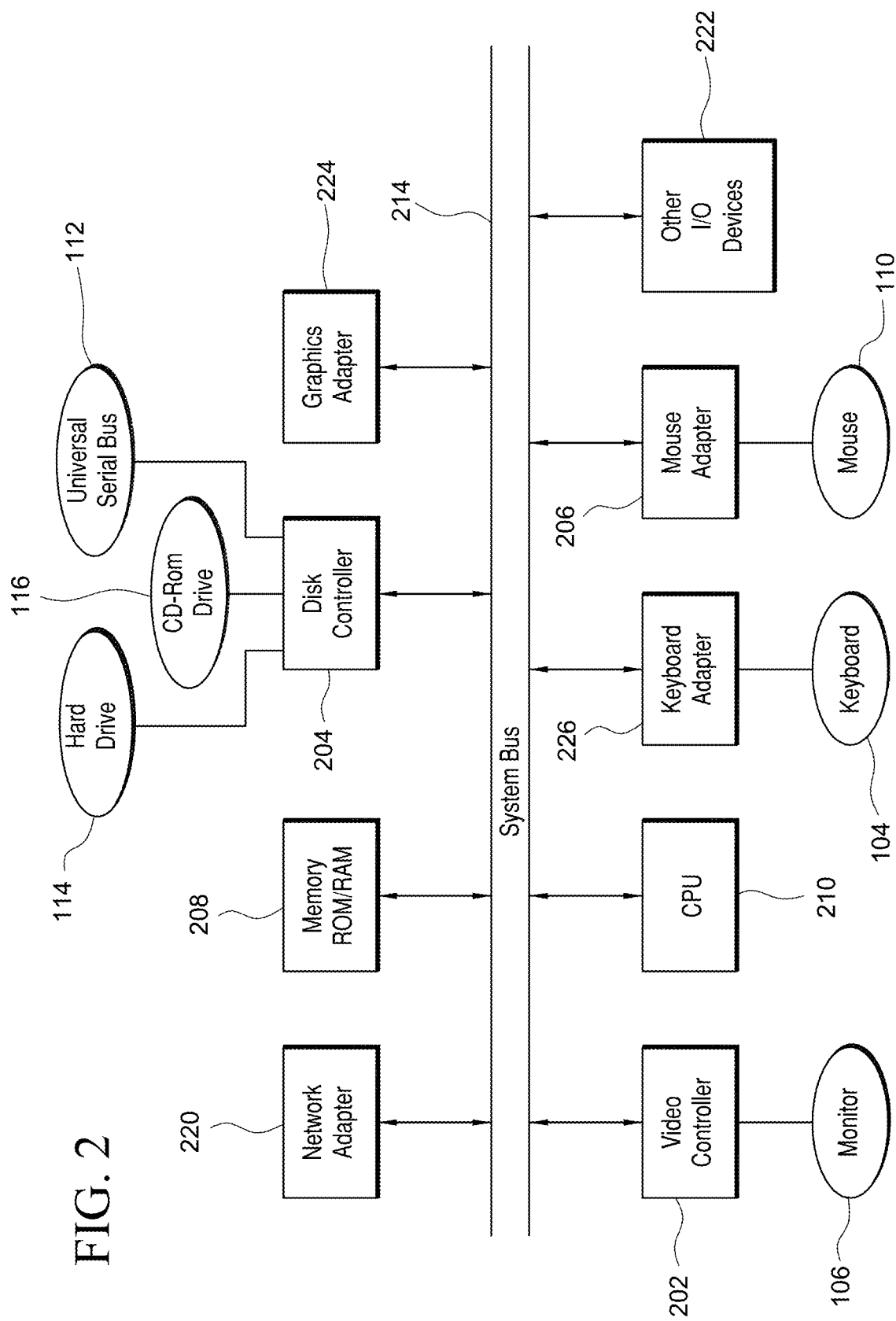
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
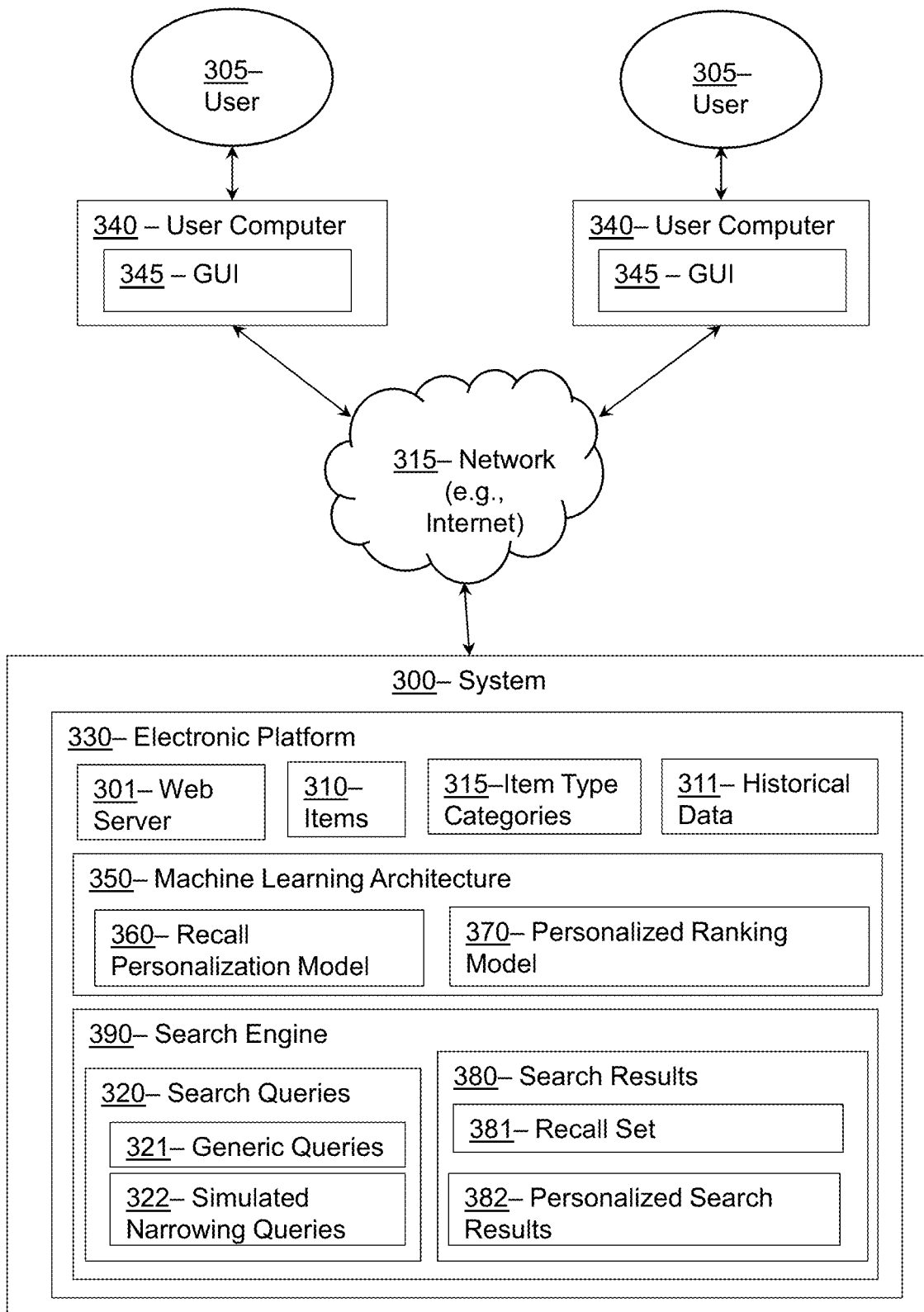
FIG. 3 illustrates a representative block diagram of a system according to certain embodiments.

Turning ahead in the drawings, FIG. 3 illustrates a block diagram of a system 300 that can be employed for personalizing search results for users, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an electronic platform 330, machine learning architecture 350, and search engine 390. Electronic platform 330, machine learning architecture 350, and search engine 390 can each be a computer system, such as computer system 100 (FIG. 1), as described above, and can each be a single computer, a single server, or a cluster or collection of computers or servers, or a cloud of computers or servers. In another embodiment, a single computer system can host each of two or more of electronic platform 330, machine learning architecture 350, and search engine 390. Additional details regarding electronic platform 330, machine learning architecture 350, and search engine 390 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or one or more server computers (e.g., which host the electronic platform 330). In the same or different embodiments, GUI 345 can comprise a website accessed through network 315 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, web server 301 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 301 can host one or more websites. For example, web server 301 can host an eCommerce website that allows users to browse and/or search for products, to add products to an electronic shopping cart, and/or to purchase products, in addition to other suitable activities.

In many embodiments, electronic platform 330, machine learning architecture 350, and search engine 390 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of electronic platform 330, machine learning architecture 350, and/or search engine 390 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of electronic platform 330, machine learning architecture 350, and/or search engine 390. In a similar manner, the processing module(s) and the memory storage module(s) can be local and/or remote to each other.

In many embodiments, electronic platform 330, machine learning architecture 350, and/or search engine 390 can be configured to communicate with one or more user computers 340. In some embodiments, user computers 340 also can be referred to as customer computers. In some embodiments, electronic platform 330, machine learning architecture 350, and/or search engine 390 can communicate or interface (e.g., interact) with one or more customer computers (such as user computers 340) through a network 315 (e.g., the Internet). Network 315 can be an intranet that is not open to the public. Accordingly, in many embodiments, electronic platform 330, machine learning architecture 350, and/or search engine 390 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, electronic platform 330, machine learning architecture 350, and/or search engine 390 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between electronic platform 330, machine learning architecture 350, and/or search engine 390, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, users 305 may operate user computers 340 to browse, view, purchase, and/or order items 310 via the electronic platform 330. For example, the electronic platform 330 may include an eCommerce website that enables users 305 to add items 310 to a digital shopping cart and to purchase the added items 310. The items 310 made available via the electronic platform 330 may generally relate to any type of product and/or service including, but not limited to, products and/or services associated with groceries, household products, entertainment, furniture, apparel, kitchenware, electronics, fashion, appliances, sporting goods, etc.

The electronic platform 330 may store taxonomy information associated with the classifying the items 310 that are offered through the electronic platform 330. For example, the taxonomy information can include a hierarchy of categories and sub-categories, and each item 310 included in an online catalog can be associated with one or more the categories and sub-categories. High-level categories may include broad labels such as "Beauty," "Clothing, Shoes, & Accessories," "Sports & Outdoors," etc. One or more lower-level categories may segment each of the high-level categories into more specific categories. The lower-level categories can include item type categories 315.

While the taxonomy information may vary across different electronic platforms 330, item type categories 315 may represent the most granular level of classification in the taxonomy in some cases. Examples of item type categories 315 within an "Electronics" category can include categories associated with labels such as "TVs," "cell phones," "tablets," etc. Examples of item type categories 315 within a "Groceries" category can include categories associated with labels such as "milk," "yogurt," "bacon," etc. Each item 310 offered by the electronic platform 330 can be assigned to, or associated with, one or more item type categories 315. Each item 310 included in an item type category 315 may include a set of attributes (e.g., brand, flavor, price band, etc.) that are associated with the item type category 315, and corresponding values of the attributes can be stored and associated with the item 310.

The electronic platform 330 can be configured to store historical data 311, which records some or all activities involving users' 305 interactions with electronic platform 330 and/or items 310 offered through the electronic platform 330. In certain embodiments, the historical usage data 311 can store information for each user 305 that indicates some or all of the following: any items 310 that were viewed by user 305; any items 310 that were selected (e.g., using a mouse click and/or tap gesture) by user 305; any items 310 that were added to a digital shopping cart by the user 305; any items 310 that were purchased by the user 305 (either via the electronic platform 330 and/or at a brick-and-mortar location); any transactions conducted by the user 305 and/or items 310 included in the transactions; all attributes of items that were viewed, selected, purchased, and/or added to a digital shopping cart; item type categories 315 associated with any items 310 that were viewed, selected, purchased, and/or added to a digital shopping cart; and/or any other data related to the user's 305 interactions with the electronic platform 330 and/or items 310 offered through the electronic platform 330.

The electronic platform 330 may include one or more search engines 390 that enable users 305 to search for items 310 offered via the electronic platform 330. For example, in certain embodiments, a user 305 may submit one or more search queries 320 to the search engine to search for items 310 desired by the user 305. The search queries 320 may include text strings (e.g., text strings that describe the desired items 310). Upon receiving a search query 320, the search engine 390 may search a digital catalog of items 310 offered by the electronic platform 330 and present the user with one or more search results 380, each of which corresponds to an item 310 offered on the electronic platform 330. The user 305 can browse the search results 380 and select any desired items 310 to be added to a digital shopping cart for purchasing.

In many cases, the search queries 320 submitted by users include generic queries 321. A generic query 321 may generally represent a broad query and/or a query that lacks descriptors for item attributes (e.g., brand names, flavors, price band, sizes, etc.) of an item 310. For example, in some cases, a generic query 321 may simply include a text string that identifies an item type category 315 (e.g., such as "Milk," "yogurt," "soup," "T-shirt", etc.).

Because an electronic platform 330 may offer a large number (e.g., thousands or millions) of items 310 that match a generic query 321, traditional search engines often present a user 305 with an exhaustive listing of matching search results 380. Moreover, the search results 380 are not ordered in a meaningful way, and do not consider the user's preferences for certain types of item attributes (e.g., user preferences for particular brands, flavors, item sizes, price, etc.). Rather, the search results 830 are often based entirely on the generic text string submitted by the user, and any user who submits the same text string will receive the same results. Consequently, a user is typically required to scroll through the exhaustive listing of search results 380 retrieved in response to the generic query 321 in attempting to identify a desired item 310, and many of the search results 380 do not align with the user's preferences. This often results in decreased sales because users 305 tend to stop searching for a desired item 310 if the item 310 is not presented at or near the top of the search results 380.

To address these and other concerns, the electronic platform 330 includes a machine learning architecture 350 that is configured to execute various functions for personalizing and/or customizing the search results 380 presented to users 305. Amongst other things, the machine learning architecture 350 can be configured to enhance generic queries 321 with contextual features that reflect users' preferences. These enhanced queries, which may be referred to as simulated narrowing queries 322, can be utilized by the search engine 390 to generate a recall set 381 of search results 380 that are personalized or customized to the user's preferences. The machine learning architecture 350 also can be configured to sort, rank and/or order the recall set 381 in a manner that accounts for the users' preferences, and to output personalized search results 382 in which desired items appear at or near the top of the results. Exemplary techniques for performing these and other functions are described in further detail below.

The configuration of the machine learning architecture 350 can vary. The machine learning architecture 350 can include one or more machine learning models, statistical models, and/or artificial neural network models that are configured to execute deep learning functions, artificial intelligence (AI) functions, machine learning functions, statistical learning functions, and/or other functions to perform the functions described herein. Exemplary configurations for the machine learning architecture 350 are described in further detail below. Regardless of the how the machine learning architecture 350 is configured, the machine learning architecture 350 can be configured to enhance search queries 320 submitted to the search engine 390 and/or enhance the sorting of the search results 380 generated by the search engine 390.

In certain embodiments, the search engine 390 includes at least two separate components. A first recall component of the search engine 390 is configured to identify a recall set 381 of search results 380. The recall set 381 of search results 380 may include a broad, relevant set of search results 380 pertaining to the items 310. In many embodiments, the focus of this component is on rapidly identifying a large collection of potentially relevant items 310 in real-time. Because there can be thousands or millions of items 310 offered on an electronic platform 330, the process of identifying the recall set 381 of search results 380 is preferably lightweight and performed with low-latency. A second ranking component of the search engine 390 sorts, orders and/or ranks the recall set 381 of search results 380 (e.g., identifies which items to show first and which items to show last) before presentation of the search results 380 to the user 305.

In certain embodiments, the machine learning architecture 350 includes a recall personalization model 360 that is configured to communicate with the first recall component of the search engine 390 to optimize the generation of the recall set 381 of search results 380. The machine learning architecture 350 also includes a personalized ranking model 370 that is configured to communicate with the ranking component of the search engine 390 to optimize the sorting, ordering and/or ranking of the search results 380 included in the recall set 381. Both the recall personalization model 360 and personalized ranking model 370 assist with generating personalized search results 382 that are selected and sorted based on user preferences.

In certain embodiments, recall personalization model 360 of the machine learning architecture 350 can be configured to translate or convert a generic query 321 (e.g., one that includes few (e.g., one to three) or no attribute descriptors) into a simulated narrowing query 322 that accounts for specific user preferences. The simulated narrowing query 322 can be utilized to generate the recall set 381 of search results 380.

One potential approach for converting a generic query 321 to a narrow query can involve supplementing the generic query 321 with natural language descriptors. However, generating a relevant narrow query in this manner may not be preferable for several reasons. First, the search engine may not know the user's intent or preferences when the user submitted the broad query. Second, even if the user's intent or preferences are known, automatically generating a narrower query using natural language descriptors can result in low accuracy given the large number of user preferences to be considered. For example, a naïve approach of formulating a narrow query in this manner may result in appending the preferences for various attributes (e.g., such as brands, flavors, prices, etc.) into a single lengthy query. However, this approach can involve extensive processing (thus, increasing latency), and often fails to select and order the search results in manner that accurately accounts for the user's preferences.

Therefore, in certain embodiments, the machine learning architecture 350 may generate a simulated narrowing query 322 that emulates or simulates a narrow natural language query. The simulated narrowing query 322 may supplement a search query 320 (e.g., a generic query 321) with a feature vector comprising contextual information reflecting the user preferences. The contextual information may indicate or predict a user's affinity or preference for each of a plurality of attribute values. For example, as explained below, the contextual information can include attribute keys that identify or predict a user's affinity or preference for each of a plurality of brands, each of a plurality of flavors, each of a plurality of price ranges (also referred to as "priced bands"), and/or other types of attribute values. As explained in further detail below, the contextual information for each user can be extracted, or derived from, the historical data 311 associated with each user 305. The simulated narrowing query 322 (which may include both the original search query 320 and the contextual information) can be received as an input signal to the search engine 390 (e.g., the first recall component of the search engine 380 mentioned above).

The search engine 390 can utilize the simulated narrowing query 322 to generate a recall set 381 of search results 380. The contextual information included with the simulated narrow query 322 permits the search engine 390 to accurately select the items to be included in the recall set 381 or search results 380 by accounting for user preferences. Additionally, in some embodiments, because the simulated narrowing query 322 can be formulated as an input signal that is generated by a component (e.g., the recall personalization model 360) decoupled from the search engine 390, the search engine 390 can produce the improved recall set 381 with very few or no modifications being incorporated into the search engine 390 itself.

The personalized ranking model 370 can be configured to receive the recall set 381 of search results 380 and generate personalized search results 382 that are specifically ordered for each of the users 305 based on the users' preferences (e.g., preferences for attributes such as brands, flavors, price bands, etc.). Thus, two users 305 who submit the same search query 320 (e.g., generic query 321), can receive different search results 380 and/or a different ordering of search results 380 based on their varying preferences.

The manner in which the personalized ranking model 370 generates and/or orders the personalized search results 382 can vary. Exemplary techniques for performing these functions are described below.

While certain portions of this disclosure explain how the techniques described herein can be used to enhance generic queries 321 (e.g., queries that lack any attribute descriptors), it should be recognized that these techniques can be used to enhance any search query 320. For example, even if a search query 320 includes one or more attribute descriptors, the techniques described herein can supplement the search query 320 with additional contextual features to more accurately predict the items users are seeking.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing an electronic platform 330, machine learning architecture 350 (and associated sub-components), and one or more end-user applications 390. The one or more processing modules 402 can be configured to execute any and all instructions associated with implementing the functions performed by these components. Exemplary configurations for each of these components are described in further detail below.

The exemplary electronic platform 330 of system 300 includes one or more databases 410. The one or more databases 410 store data and information related to items 310 (e.g., products and/or services) that are offered or made available via the electronic platform 330. For example, for each item 310, metadata associated with the item 310 can include any or all of the following: an item name or title, an item type category 315 associated with the item, a price 412, one or more customer ratings for the item, an item description, images corresponding to the item, a number of total sales, and various other data associated with the item 310. The metadata for each item 310 also may include various attributes 415 and their corresponding values.

Figure 6:
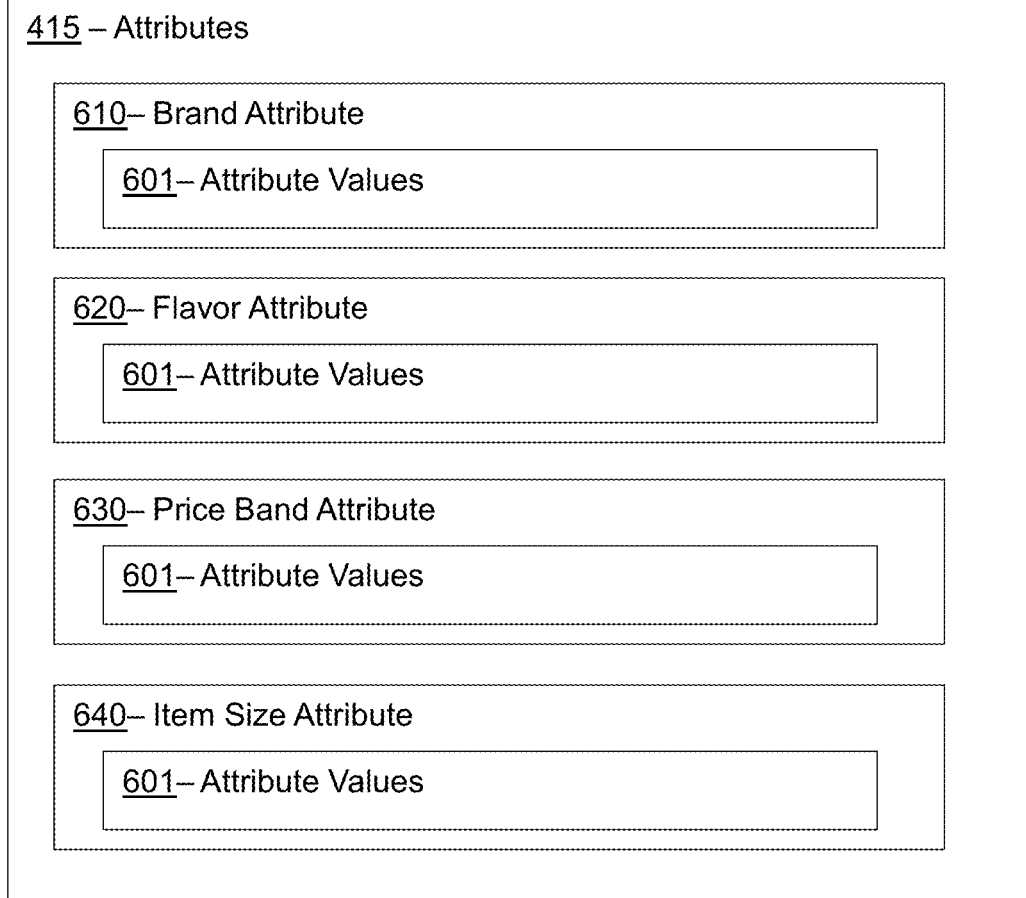
FIG. 6 illustrates a representative block diagram for exemplary attributes according to certain embodiments.

FIG. 6 is a diagram that illustrates exemplary attributes 415 that may be associated with some or all of the items. Each attribute 415 can be associated with, or include, one or more attribute values 601 as described below. The types of attributes 415 can vary across different items and, in some cases, may depend upon the item type categories associated with the items.

Below is a listing of exemplary attributes 415 and corresponding attribute values 601.

(1) Brand Attribute 610: Indicates or identifies sources (e.g., a retailers, manufacturers, companies, and/or entities) associated with items. The attribute values 601 for the brand attribute 610 may include various names (or other identifiers) that indicate each source that provides a particular type of item 310 on the electronic platform (e.g., Brand 1, Brand 2, Brand 3, Brand 4, etc.). Each item can be associated with a particular source based on the attribute value 601 of the brand attribute 610 included in the metadata for the item.

(2) Flavor Attribute 620: Indicates or identifies flavors associated with the items 310. The attribute values 601 for the flavor attribute 620 may include a range of potential flavors (e.g., vanilla, chocolate, strawberry, etc.) that can apply to items offered on the electronic platform. Some or all of the items can be associated with a flavor based on the attribute value 601 of the flavor attribute 620 included in the metadata for the item.

(3) Price Band Attribute 630: Indicates or identifies the expensiveness of items relative to other items in the same item type category and/or a price range within the item type category. For example, for each item type category, the electronic platform may identify various price bands, each of which is associated with a price range (e.g., low price range=$0.01-$5.00, medium price range=$5.01-$10.00, and high price range=$10.01 and above). Each item can be associated with a particular price band based on the attribute value 601 of the price band attribute 630 included in the metadata for the item.

(4) Size Attribute 640: Indicates or identifies units of measurement associated with the items 310. The attribute values 601 for the size attribute 640 may include a range of potential sizes. For example, for grocery items, the attribute values 601 may indicate typical product sizes such as gallons, fluid ounces, and/or pounds. Likewise, for apparel items, the attribute values 601 may indicate clothing sizes (e.g., small, medium, large, extra-large, etc.). Similarly, for electronics, the attribute values 601 may indicate the dimensions of the items. Some or all of the items can be associated with a size based on the attribute value 601 of the size attribute 640 included in the metadata for the item.

It should be recognized that items can be associated with many other types of attributes (e.g., color, dietary restrictions, organic preferences, perishability preferences, etc.). The aforementioned attributes 415 are merely provided as examples. Additionally, it also should be recognized the attributes 415 for each item type category 415 can vary. For example, the attributes for an item type category 415 for T-Shirts may include size, color, price band, and source, but may not include attributes for flavor and dietary restrictions.

Returning to FIG. 4, the one or more databases 410 also may store historical information 311. As mentioned above, electronic platform 330 can be configured to store historical data 311, which records some or all activities involving users' 305 interactions with electronic platform 330 and/or items 310 offered through the electronic platform 330. For example, the historical data 311 associated with each user can include any information pertaining to items 310 items purchased in transactions, items added to digital shopping carts, items selected or inspected by the user via the electronic platform 330, and/or any attributes of items 310 that were purchased, viewed, and/or added to a digital shopping cart.

The historical information 311 also may store or include session data 412 for each user. The session data 413 can record any all data associated with user sessions on the electronic platform 330. For example, a user session may represent a temporary and interactive information interchange between a user computer and the electronic platform 330. During an exemplary user session, a user may view or select one or more items 310 to view associated details, submit search queries 320, browse search results 380, add items 310 to digital shopping carts, etc. The session data 412 for a user can store can store all user activities (e.g., item views, add-to-cart selections, etc.) for each session. The session data 412 also can store any data pertaining to attributes 415 of items 310 that were involved in these activities.

In certain embodiments, the recall personalization model 360 can utilize the historical information 311 to derive, personalization preferences 420 for each of the users. The personalization preferences 420 for a user may indicate the user's preferences with respect to any attributes 415 (or corresponding attribute values) of items 310. For example, the personalization preferences 420 can be used to determine whether a user is loyal to, or prefers, one or more specific brands, whether the user prefers particular price bands for items 310 (e.g., cheap, medium-priced, or expensive), whether the user prefers a particular flavors for items 310, and/or other similar attribute preferences. The recall personalization model 360 can derive category-agnostic personalization preferences (e.g., global preferences that apply across all item type categories) and/or category-specific personalization preferences (e.g., specific preferences that are stored for each item type category 315).

To derive the personalization preferences 420 for a user, the recall personalization model 360 may generate contextual features 463 based, at least in part, on the historical data 311 associated with the user. The contextual features 463 can include any metadata or information that can be used to guide a search engine to find a recall set 381 of search results 380 and/or order the search results 380 to generate personalized search results 382.

When a user initially submits a search query 320, the search engine 390 can automatically retrieve or receive contextual features 463, such as device type information (e.g., indicating the model or type of the user computer and operating system), geolocation information (e.g., indicating a location of a user), browser information (e.g., indicating which browser is being used to access the electronic platform 330), and/or any other information present in a browser cookie. The recall personalization model 360 can be configured to supplement the contextual features 463 to include features related to the personalization preferences 420 for the user. Exemplary techniques for supplementing the contextual features 463 with the personalization preferences 420 for users is described below.

Initially, the recall personalization model 360 may pre-compute a plurality of attribute keys 464 for each of the users. Generally speaking, each of the attribute keys 464 may include a tuple of information that includes a user identifier (ID), an attribute 415, an attribute value 601 (FIG. 6), and/or a preference score 465. For each user, a plurality of attribute keys 464 can be generated for each of a plurality of attributes 415, and the attribute keys 464 can be used to derive the contextual features 463 for the user.

Below are examples of attribute keys 464 for a flavor attribute that is associated with an item type category 315 for yogurt items.
(user id, 'flavor', 'strawberry', 0.5)
(user id, 'flavor', 'chocolate', 0.5)

Below are examples of attribute keys 464 for a brand attribute that is associated with an item type category 315 for yogurt items.
(user id, 'brand', 'Yogurt Brand #1', 0.7)
(user id, 'brand', 'Yogurt Brand #2', 0.6)
(user id, 'brand', 'Yogurt Brand #3', 0.5)

Similar attribute keys 464 and corresponding tuples can be generated for any other attributes. The last parameter of each attribute key 464 includes a preference score 465. The preference scores 465 may indicate affinities of users with respect to each of the attribute values (e.g., each of a plurality of brands, each of a plurality flavors, each of a plurality of price bands, each of a plurality of sizes, etc.). In certain embodiments, the recall personalization model 360 can pre-compute the preference scores 465 based, at least in part, on the historical data 311 for the users.

The attribute keys 464 for each user can be stored in a database (e.g., database 410). Before storing the attribute keys 464 in the database, the attribute keys 464 for each user can be sorted in descending order of preference score 465 to permit rapid retrieval of relevant attribute keys 464 during subsequent processing steps.

When a user submits a search query 320 (e.g., a generic query 321), the recall personalization model 360 can retrieve the attribute keys 464 to generate the contextual features 463 that are provided to the search engine 390. At least a portion of the attribute keys 464 can be incorporated in contextual features 463 to generate the simulated narrowing query 322. The contextual features 463 included with the simulated narrowing query 322 can be utilized by the search engine 390 to understand or predict the true intent of the user's search query 320.

For embodiments in which a user's preferences are determined in category-agnostic manner, the recall personalization model 360 can select or retrieve the top k number of attribute keys 464 for each item attribute 415 (which may be represented by $k_a$). On the other hand, if customers' preferences are stored on each category level, the recall personalization model 360 can utilize item type category 315 (which may be identified by the search engine 390 and provided to the recall personalization model 360) to select the attribute keys 464. For each attribute 415 that applies to the item type category 315, the recall personalization model 360 can select or retrieve $k_{c,a}$ number of attribute keys 464 for each item attribute 415. In certain embodiments, the number of attribute keys 464 (e.g., the values fork and/or $k_{c,a}$) utilized by the recall personalization model 360 can be pre-computed or predetermined before users submit search queries 320.

In certain embodiments, the recall personalization model 360 includes an attribute key selection model 461 that is configured to select the optimal number of number of attribute keys 464 (e.g., the values fork and/or $k_{c,a}$) to be included with the contextual features 463. Selecting the optimal number of attribute keys 464 is a technically challenging problem. For example, selection of only a single attribute key 464 for each attribute 415 may result in very narrow search results. On the other hand, selecting too many attribute keys 464 for each attribute 415 can render the user preferences useless. The recall personalization model 360 can select the optimal number of attribute keys 464 for each attribute 415 by balancing these two competing interests.

The configuration of the attribute key selection model 461, as well as the manner in which the attribute key selection model 461 selects the optimal number of attribute keys 464 can vary. Two exemplary approaches are described below. In these examples, the attribute key selection model 461 uses a statistical model 462 to select the optimal number of number of attribute keys 464 (e.g., the values for k and/or $k_{c,a}$). Other approaches and models also may be utilized.

In one approach, the statistical model 462 selects the number of attribute keys 464 based, at least in part, on the number of preferences that are stored for each user, which can be computed using Equation 1 below.

$$n_a = \Sigma_u n_{a,u} \qquad (1)$$

wherein $n_{a,u}$ represents the number of attribute values for attribute key a for user u, and $n_a$ represents aggregated occurrence of attribute key a.

A naïve solution is to divide the value derived from Equation 1 with the number of users |U|. However, some users place transactions more frequently than other users. Suppose the number of transactions in a given time period for a user u is trx(u). This can be summed over all transactions using Equation 2 below, where Z represents the sum of all transactions.

$$Z=\Sigma_u \text{trx}(u) \quad (2)$$

The value of p(u) can be defined as $$p(u) = \frac{\text{trx}(u)}{Z}.$$

Using this formulation, the attribute key selection model 461 can compute the expected value using Equation 3 below, where $E_{p(u)}[n_a]$ is the number of attribute keys 464 selected.

$$E_{p(u)}[n_a]=\Sigma_u n_{a,u} p(u) \quad (3)$$

The value of $k_a$ can be set to the value derived from Equation 3. To compute $k_{c,a}$, the attribute key selection model 461 can utilize Equation 3 to compute the value for each category c. More precisely, the value for $n_a$ can be substituted with $n_{c,a}=\Sigma_u n_{c,a,u}$. Similarly, $Z_c=\Sigma_u \text{trx}(u; c)$ can be substituted for Equation 2 above (where trx(u; c) denotes number of transactions a user u has made in category c) and $$p(u; c) = \frac{\text{trx}(u \mid c)}{Z}$$

can replace $$p(u) = \frac{\text{trx}(u)}{Z}.$$

Using the above formulation, the number of attribute keys 464 for each category can be selected using Equation 4 below.

$$E_{p(u|c)}[n_{c,a}]=\Sigma_u n_{c,a,u} p(u;c) \quad (4)$$

In a second approach, the statistical model 462 selects the number of attribute keys 464 based on statistical characteristics of preference scores 465. For each attribute a, there are attribute values v. Suppose the preference score 465 for the attribute value v for user u is represented as s(u, a, v) and $\mu_{u,a}$, $\sigma_{u,a}$ is defined as its corresponding mean and standard deviation of scores s(u, a, v) for attribute a and user u. Equation 5 can be used to calculate the expected scores across all users.

$$\mu_a=E_{p(u)}[\mu_{u,a}]=\Sigma_u \mu_{u,a} \cdot p(u) \quad (5)$$

Similarly, the sample standard deviation can be computed across all users to derive $\sigma_a$. Then, for each user, Equation 6 can compute value $m_{u,a}$.

$$m_{u,a}=\text{count}(s(u,a,v) > \mu_a + \alpha \cdot \sigma_a) \quad (6)$$

wherein $m_{u,a}$ represents the number of attributes values that exist above a threshold for user u and attribute a, and $\alpha$ is an adjustable parameter that can vary depending on a desired level of stringency with respect to including attributes in the criteria for selecting the recall set 381.

The above formulation ($\mu_a+\alpha \cdot \sigma_a$) is analogous to computing confidence intervals. Then, $k_a=E_{p(u)}[m_a]$. Without loss of generality, similar equations are used to set the value of $k_{c,a}$.

In certain embodiments, the value of a can be selecting using a hill climbing technique. For example, let $\alpha$ be a set of possible parameters (0.01, 0.1, 0.25, 0.5, 0.75, 1, 1.25, ... ). For each of the parameters, a recall set that would be returned by the search engine 390 is identified for each of the $k_a$ (adjusted based on $\alpha$). These recall sets can be saved as a historical data set H. A set of search-click data can also be saved as dataset S. It is now possible to derive evaluation metrics using eval (H, S), where evaluation metrics can be those such as NDCG (normalized discount cumulative gain), MRR (mean reciprocal rank), and/or MAP (mean average precision). Then, $\alpha$ can be selected by using the best performing evaluation metric.

After the optimal number of attribute keys 464 is determined for each attribute 415, the attribute key selection model 461 selects the best scoring attribute keys 464 for each attribute 415 as contextual features 463 to be included in a feature vector 480. The feature vector 480 comprising the contextual features 463 (or corresponding attribute keys 464) then can be included in the simulated narrowing query 322 provided to the recall component of the search engine 390 that generates the recall set 381.

Advantageously, the search engine 390 can easily accommodate the varying sizes of feature vectors 480 and train the recall retrieval mechanism with the contextual features 463 to personalize the recall set 381. Because the underlying recall retrieval mechanism does not need to be modified, this permits the search engine 390 to rapidly and easily accommodate additional user preferences over the course of time, or as new preferences and attributed are incorporated into the framework.

After the recall personalization model 360 generates the personalized recall set 381 of search results 380 for a given search query 320, the recall set 381 and simulated narrowing query 322 can be provided to the personalized ranking model 370. As mentioned above, the personalized ranking model 370 can be configured to optimize the ordering, ranking, and/or sorting of the recall set 381 in a manner that accounts for user preferences. The personalized ranking model 370 generates and outputs personalized search results 382, which can be displayed on user computers.

FIG. 5A is a block diagram illustrating an exemplary system 500A for a personalized ranking model 370. The system can include an explicit learning model 510, implicit learning model 520, and an importance model 530. Exemplary configurations for each of these models are described below.

The explicit learning model 510 can be trained to learn users' affinities or preferences for particular attribute values 601 (FIG. 6) (e.g., for particular brands, flavors, price bands, dietary preferences, etc.) based, at least in part, on the users' explicit interactions with the electronic platform. For example, for a given user, the explicit learning model 510 can receive and analyze the historical data associated with the user (e.g., indicating items viewed by the user, items that have been added to a digital shopping cart, items purchased by the user, and attributes for these items). This information can be used to learn the user's affinity or preference for each attribute value 601 (FIG. 6) across a plurality of different attributes 415 (FIGS. 4 and 6). For each user, the explicit learning model 510 can generate affinity scores 515 that predict or indicate the user's preference for each attribute value. In certain embodiments, the affinity scores 515 can represent a number between 0 and 1, where higher scores indicate a greater affinity for the attribute value and lower scores indicate a lower affinity for the attribute value.

In certain embodiments, to facilitate training of the explicit learning model 510, a training dataset can be constructed from the historical data stored for a plurality of users (e.g., the historical data that indicates items viewed, added to digital shopping carts, and/or purchased by each of a plurality of users). For example, a user matrix X for a customer c on attribute a can be constructed as shown in the example below.

$$X_{c,u} = \begin{bmatrix} 3 & 4 & 7 \\ 2 & 1 & 6 \\ 6 & 5 & 2 \end{bmatrix}$$

In the above example, the rows of the matrix signify action types (views/add-to-cart/purchase) and the columns signify months. If there are k+1 months of data available, training may be performed using k months of data. In this example, three months of training data is used for training (represented by each column) and there are three action types (represented by each row). For example, the views of the attribute a for Month 3 may be located in the first row (for view) and third column, which is set to the value of seven based how many times the user viewed an item that includes attribute a during Month 3.

The following binarization technique or procedure can be used for labeling a positive example given the denotations for the matrix of user signals $X_{c,u,a}$, temporal weights $W_t$, and action weights $W_a$ identified below.

$$X_{c,u,a} = \begin{bmatrix} x_{11} & \cdots & x_{1k} & \cdots \\ \vdots & \ddots & \vdots & \cdots \\ \cdots & \cdots & \cdots & x_{jk} \end{bmatrix}$$

$$W_t = \{w_{m1}, w_{m2}, \ldots w_{mk}\}$$

$$W_a = \{w_{a1}, w_{a2}, \ldots w_{aj}\}$$

Initially, the expected signal value for the k+1$^{th}$ instance $exp_{xk+1}$ is calculated. The value of $exp_{xk+1}$ is calculated using Equation 7 below.

$$exp_{xk+1} = \frac{(W_t \times X_{c,u,a}^T) \cdot W_a}{\|(W_t \times X_{c,u,a}^T)\|_2^2 \|(W_a)\|_2^2} \quad (7)$$

Following this calculation, the binarization formulation is calculated using Equation 8 below.

$$\text{Label} = \begin{cases} 1, & exp_{xk+1} \pounds 0.5 \\ 0, & \text{otherwise} \end{cases} \quad (8)$$

In certain embodiments, a greater weight can be assigned to the weight for transactions or purchases in comparison to the weights assigned to add-to-cart actions and view actions. Additionally, the weights assigned to more recent transactions or purchases can be greater than the weights assigned to older transactions or purchases.

The labels assigned by this binary labeling technique can be used to learn the weights for the features using logistic regression. Then, given a feature set for a new user-attribute pair, the explicit learning model 510 is able to calculate the affinity score 515 for that user on behalf of the attribute values for a given attribute.

In various scenarios, the electronic platform may offer large numbers of items (e.g., millions of items) to large numbers of users (e.g., millions of users). While the explicit understanding of customer preferences can produce highly accurate predictions, storing a plurality of affinity scores 515 across multiple item type categories for each of the users may not be practical due to storage issues. Furthermore, the explicit understanding of customer preferences for a user may only be obtained for items that the user has interacted (e.g., purchased, viewed, and/or added to a digital shopping cart) with via the electronic platform 330.

The personalized ranking model 370 of the machine learning architecture also includes an implicit learning model 520 that is able to overcome these and other hurdles. In certain embodiments, the implicit learning model 520 can be configured to infer understanding of customer affinities for the attributes values for any of the attributes. The implicit learning model 520 expands the number and diversity of items that can be included in the personalized search results using this implicit understanding, and does so in manner that does not add to storage costs.

The implicit learning model 520 includes a natural language learning model 521 that is configured to generate similarity scores 525 between attribute-item pairs 522, each of which comprises an attribute value 601 (FIG. 6.) and item type category (e.g., represented as <attribute value, item type>). As explained below, these similarity scores 525 can be utilized to infer users' preferences for attributes (and to select corresponding items) in situations where explicit affinity scores 515 are not available.

The examples and description provided below demonstrate a natural language learning model 521 that can be implemented using a Word2vec model. However, it should be recognized that other natural language learning models 521 (and other types of learning models) also can be utilized to implement the functions described below.

Word2vec is a machine learning model used for natural language processing, and includes a neural network model that can learn word associations from a large corpus of text. In certain embodiments, Word2Vec can be configured as a skip-gram model. The training objective of skip-gram is to learn word vector representations that can accurately predict the context of words in the same sentence. Mathematically, given a sequence of training words ($w_1, w_2, \ldots, w_T$), the objective of the skip-gram model is to maximize the average log-likelihood of words that are in the same neighborhood of each other. This may be performed using Equation 9 below.

$$\frac{1}{T} \sum_{t=1}^{T} \sum_{j=-k}^{j=k} \log p(w_{t+j} | w_t) \quad (9)$$

wherein:
k is the size of the training window;
$w_t$ is the target word;
$w_{t+j}$ is the neighboring word in window of +−k; and
T is the length of sequence of training words ($w_1, w_2, \ldots, w_T$).

In the skip-gram model, every word w is associated with two vectors $u_w$ and $v_w$, which are vector representations of w as word and context, respectively. The probability of correctly predicting word $w_i$ given word w is determined by the softmax model, which is illustrated in Equation 10 below.

$$p(w_i \mid w_j) = \frac{\exp(u_{w_i}^T v_{w_j})}{\sum_{i=1}^{V} \exp(u_i^T v_{w_j})} \quad (10)$$

wherein:
$u_{wi}$ is the vector representation of word $w_i$;
$v_{wj}$ is the vector representation of word $w_j$; and
$u_{wi}^T$ is transpose of vector representation of word $w_i$.
Similarity scores between words can be obtained using cosine distance as demonstrated in Equation 11 below.

$$\text{similarity}(A, B) = \frac{A \cdot B}{\|A\| \times \|B\|} = \frac{\sum_{i=1}^{n} A_i \times B_i}{\sqrt{\sum_{i=1}^{n} A_i^2} \times \sqrt{\sum_{i=1}^{n} B_i^2}} \quad (11)$$

wherein:
A and B represent word vectors;
‖A‖ represents modulus of word vector A; and
‖B‖ represents modulus of word vector B.

The natural language learning model 521 can adapt the above-described techniques to determine attribute-to-attribute similarities (e.g., brand-to-brand similarities) which, in turn, can be used to generate personalized search results. This can be accomplished, at least in part, by replacing the sentences and/or words typically processed by a Word2vec model with session data 412 (FIG. 4) derived from users' sessions.

For example, for embodiments in which implicit learning is being applied to determine for a brand attribute 610 (FIG. 6), each sentence can be replaced by a user's session data 412 (FIG. 4) for a user session in which the customer views multiple items in a sequence. An example of a single user session can be [item1, item2, item3], where user views item1, item2, and item3 in sequence. A word w can be used to represent each of the three items.

For instance, suppose Item 1 belongs to brand "BrandName1" and item type category "Milk," item2 belongs to brand "BrandName2" and item type category "Cheese," and item3 belongs to brand "BrandName3" and item type category "Yogurt." In this scenario, the sentence input to the natural language learning model 521 can be represented as [<BrandName1, Milk>, <BrandName2, Cheese>, <BrandName3, Yogurt>]. Each attribute-item type pair 522 (<attribute value, item type> or, in this example, <brand, item type>) can represent a word in sentence, and each word w represents a combination of a brand and item type category.

In the above equations (Equations 9-11), the word (represented as w in Equations 9-10, and A and B in Equation 11) can be substituted for an attribute-item type pair 522. Thus, the session data 412 (FIG. 4) for a user session can be input as sentence to the natural language learning model 521 to obtain associations between brands at the item type category level. The natural language learning model 521 can output a plurality of similar attribute-item type pairs 522.

Figure 5B:
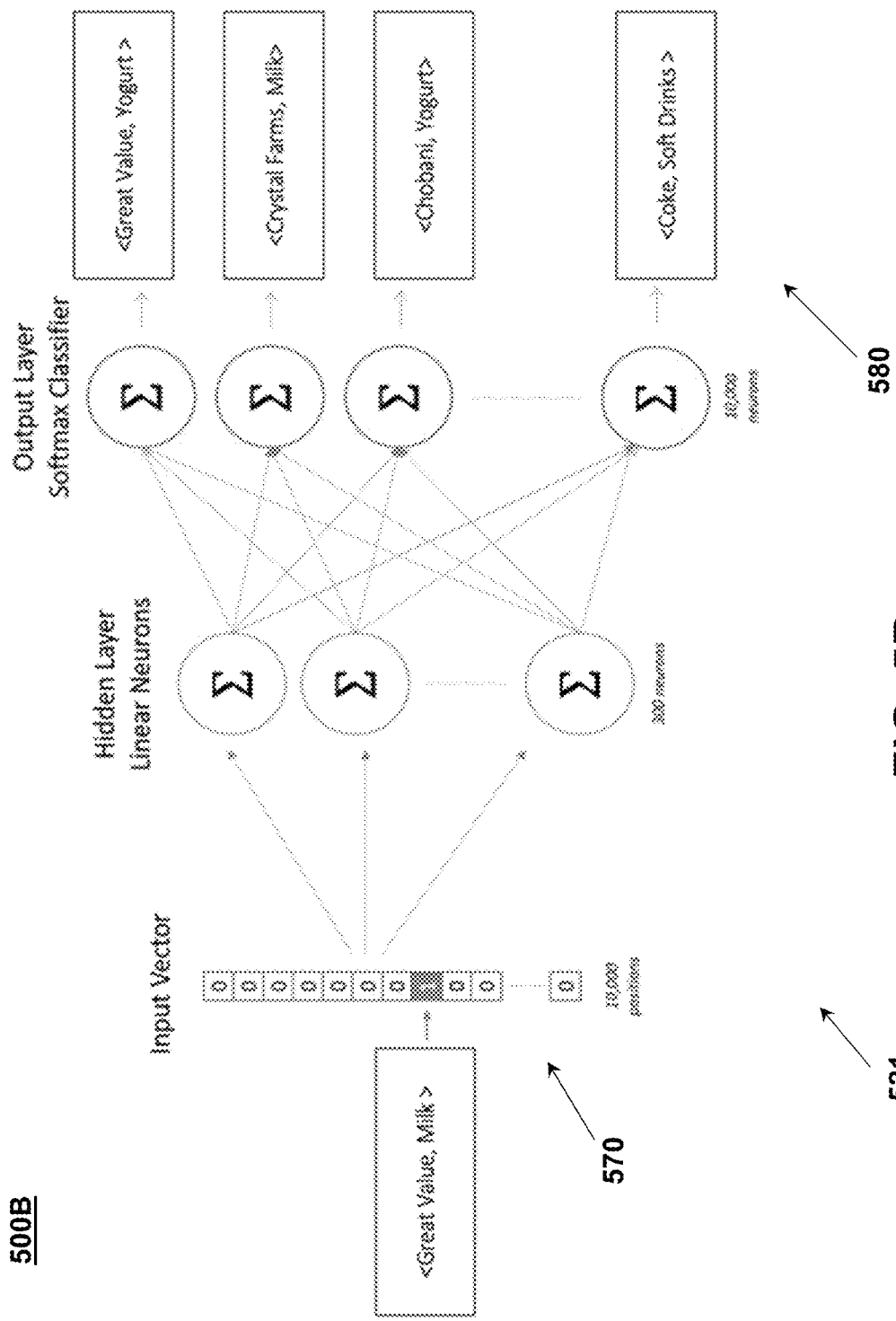
FIG. 5B illustrates a representative flow diagram for a natural language learning model according to certain embodiments.

FIG. 5B is a diagram illustrating an exemplary architecture 500B for a natural language learning model 521 (e.g., a Word2vec model). An input vector representation 570 for an attribute-item type pair (<brand, item type>) can be received as an input to natural language learning model 521. The natural language learning model 521 generates similarity scores 525 (FIG. 5A) between the input attribute-item type pair and a plurality of other attribute-item pairs using cosine distance. In certain embodiments, each similarity score may represent a value between 0 and 1, where higher scores indicate a greater similarity to the input vector representation 570 and lower scores indicate a lesser similarity to the input vector representation 570.

For each input vector representation 570, the natural language learning model 521 can output a plurality of similar attribute-item pairs 580 (e.g., output five hundred similar attribute-item pairs) and their corresponding similarity scores 525 (FIG. 5A). The similar attribute-item pairs 580 output by the natural language learning model 521 can be sorted by their similarity scores 525 (FIG. 5A) in descending order. The similar attribute-item type pairs 580 having the greatest n similarity scores 525 (FIG. 5A) can be selected and stored. In certain embodiments, the value of n can be restricted to five hundred to avoid storage issues.

Returning to FIG. 5A, the explicit and implicit understanding functions performed by the explicit learning model 510 and implicit learning model 520 can be combined by the personalized ranking model 370 (FIGS. 3-4) to assist with generating personalized search results 382 (FIGS. 3-4) for users. Table 1 below includes pseudocode illustrating an exemplary algorithm that combines the explicit and implicit understanding of these models.

TABLE 1

Item - A: Brand-> b1, Item Type-> PT1
Cid - X
If X has explicit brand affinity score for <b1, PT1> available:
   Return X's explicit brand affinity score for <b1, PT1>
Else:
   For <b, PT> in list of 500 similar <brand, item type> for <b1, PT1>:
     If X explicit brand affinity score for <b, PT> available:
       Return (X's explicit brand affinity score <b, PT> * Similarity score (<b1, PT1>, <b, PT>)
     Else:
       Continue
Return 0

With respect to the above pseudocode, each input attribute-item type pair (<brand, item type>) has n−1 similar attribute-item type pairs that are sorted by their similarity scores in descending order 525, where n is the number of attribute-item type pairs available. In this example, n is set to five hundred.

The algorithm initially checks whether an explicit affinity score 515 is available for a given user X for a brand attribute. If an affinity score 515 is available, the personalized ranking model 370 (FIGS. 3-4) utilizes the score to generate the personalized search results for the user.

If an explicit affinity score 515 is not available for a brand attribute, then the algorithm traverse through similar attribute-item type pairs 580 (FIG. 5B) until it is determined that the user has an explicit brand affinity score for a similar attribute-item type pair 580 (FIG. 5B). Then, the affinity score 515 can be computed by multiplying the explicit brand affinity score with the similarity score (explicit brand affinity score*Brand-to-Brand Attribute item type pair similarity score). Thus, like the affinity scores 515 derived using the implicit learning model 520 represent the affinity scores 515 generated by the explicit learning module 510 for similar attribute-item pairs 580 weighted according to the similarity scores 525 for the similar attribute-item pairs 580.

The affinity scores 515 (which can be derived from both explicit and implicit learning as described above) can be used to optimize generation of the personalized search results provided to users.

The importance model 530 also can generate importance scores 535 that can be used to optimize the personalized search results provided to users. Generally speaking, for each user, the importance scores 535 can indicate or predict how important each attribute 415 (FIGS. 4 and 6) is to the user. For example, a branch attribute may be most important to some users in deciding whether or not to purchase items, and a price band attribute may be most important to other users in deciding whether or not to purchase items. The importance scores 535 generated for a user by the importance model 530 can indicate the relative importance of each attribute 415 (FIGS. 4 and 6) to that user. In certain embodiments, each importance score 535 may represent a value between 0 and 1, where higher scores indicate a greater importance and lower scores indicate a lesser importance. Exemplary techniques for generating importance scores 535 are described below.

Given a user's transactions T in a given attribute a, the following notations can be defined:

$T_a = T_1, \ldots T_n$
$\propto = \max(T_1, \ldots T_n)$.

Given these notations, the importance scores 535 can be calculated using Equation 12 below.

$$A_{imp} = \frac{\propto}{\sum_{i=1}^{n} T_i} \quad (12)$$

A training dataset can be constructed from attribute importance scores for a given attribute for each month. If there are k+1 months of data, the first k months can be used for training. A gradient boosted tree model can be used for regression to predict the attribute importance for the k+1$^{th}$ instance.

In certain embodiments, the personalized ranking model 370 can generate item preference scores 540 by combining the affinity scores 515 (which may be obtained using explicit and/or implicit understanding techniques described above) and the importance scores 535. The item preference scores 540 can be utilized to recommend the most relevant items to users, and to sort, rank, and/or order the search results in a manner that includes the most relevant items at or near the top of a listing of personalized search results.

The item preference scores 540 can be formulated using Equation 13 below.

$$\text{Preference Score} = \Sigma_{i=1}^{N} A_{imp,i} \cdot A_{aff,i} \quad (13)$$

wherein $A_{imp,i}$ refers to attribute importance score and $A_{aff,i}$ refers to affinity score for i$^{th}$ attribute for a total of N attributes.

Combining the affinity scores 515 with the importance scores 535 permits the personalized ranking model 370 to map the users with the items that are of greatest interests to the users.

To illustrate by way of example, consider a scenario in which an item preference score 540 is being generated for the following item: vanilla yogurt offered by Brand #3. In this example, assume the user has a brand affinity score of 0.6, a flavor affinity score of 0.3, a brand attribute importance score of 0.8 and a flavor importance score of 0.5. Given such, the item preference score 540 can be computed as shown below.

Preference Score=(0.6×0.8)+(0.3×0.5)=0.63

In certain embodiments, the personalized ranking model 370 re-ranks and/or sorts the recall set of search results based on their preference scores 540 for corresponding items in descending order. This re-ranked or sorted set of search results can represent the personalized search results 382 (FIGS. 3-4) that is transmitted and displayed to the users.

FIG. 7 illustrates a representative flow diagram for a system 700 that generates personalized search results according to certain embodiments.

A user computer 340 transmits a search query 320 (FIGS. 3-4) over a network to a website 710. In many cases, the search query may represent a text string. The website 710 may represent an e-ecommerce website that is offered by the electronic platform. In addition to receiving the text query, the website 710 may receive a user ID (e.g., which identifies a user associated with user computer 340) and some basic contextual information (e.g., indicating device type information, geolocation information, browser information, and/or any other information present in a browser cookie).

All of the information received by the website 710 is transmitted to a search engine recall component 720 of a search engine 390. The search engine recall component 720 is configured to generate a recall set of search results.

Before generating the recall set of search results, the search engine recall component 720 sends the information (e.g., user ID, search query, and basic contextual information) to the recall personalization model 360. The search engine recall component 720 also may identify an item type category corresponding to the search query 320 and transmit this to the recall personalization model 360 as well.

The recall personalization model 360 enhances the search query 320 with contextual features related to the user's preferences (e.g., preferences for certain brands, flavors, sizes, price bands, etc.). The enhanced search query 320 represents the simulated narrowing query 322 (FIGS. 3-4), which can simulate a more narrow natural language query using the contextual features.

The simulated narrowing query 322 (FIGS. 3-4) is transmitted back to the recall personalization model 360 of the search engine 390, along with the user ID. The contextual features included with the simulated narrowing query 322 (FIGS. 3-4) are received as an input, and used to personalize the recall set of search results generated by the search engine recall component 720.

The search engine recall component 720 provides the personalized recall set, simulated narrowing query, and user ID to the personalized ranking model 370. As explained above, in certain embodiments, this search engine recall component 720 determines item preference scores based on the affinity scores and importance scores generated by the personalized ranking model 370. This scoring information is sent with the recall set and user ID to a search engine ranking component 730 of the search engine 390.

The search engine ranking component 730 of the search engine uses the scoring information to sort, rank, and/or order the recall set of search results, thereby generating personalized search results that are customized to the user's preferences. The search engine 390 transmits the personalized search results to the user computer 340 for display to the user.

FIG. 8 illustrates a flow chart for an exemplary method 800, according to certain embodiments. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIGS. 3-4), electronic platform 330 (FIG. 3-4), search engine 390 (FIGS. 3-4), and/or machine learning architecture 350 (FIGS. 3-4) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as system 300 (FIGS. 3-4), electronic platform 330 (FIG. 3-4), search engine 390 (FIGS. 3-4), and/or machine learning architecture 350 (FIGS. 3-4). The processing module(s) can be similar or identical to the processing module(s) described above with respect to computer system 100 (FIG. 1).

In many embodiments, method 800 can comprise an activity 810 of providing a search engine that includes a recall personalization model configured to general recall sets of search results based, at least in part, on personalization preferences of users.

Method 800 can further comprise an activity 820 of receiving, at the search engine, a search query submitted by a user.

Method 800 can further comprise an activity 830 of generating, using the recall personalization module, a feature vector for the user that includes contextual features indicating the personalization preferences associated with the user.

Method 800 can further comprise an activity 840 of generating, using the recall personalization model, a simulated narrowing query that includes the search query submitted by the user and the feature vector that includes the contextual features.

Method 800 can further comprise an activity 850 of generating, using the search engine, a recall set of search results based, at least in part, on the simulated narrowing query.

FIG. 9 illustrates a flow chart for an exemplary method 900, according to certain embodiments. Method 900 is merely exemplary and is not limited to the embodiments presented herein. Method 900 can be employed in many different embodiments or examples not specifically depicted or described herein. In some embodiments, the activities of method 900 can be performed in the order presented. In other embodiments, the activities of method 900 can be performed in any suitable order. In still other embodiments, one or more of the activities of method 900 can be combined or skipped. In many embodiments, system 300 (FIGS. 3-4), electronic platform 330 (FIG. 3-4), search engine 390 (FIGS. 3-4), and/or machine learning architecture 350 (FIGS. 3-4) can be suitable to perform method 900 and/or one or more of the activities of method 900. In these or other embodiments, one or more of the activities of method 900 can be implemented as one or more computer instructions configured to run at one or more processing modules and configured to be stored at one or more non-transitory memory storage modules. Such non-transitory memory storage modules can be part of a computer system such as system 300 (FIGS. 3-4), electronic platform 330 (FIG. 3-4), search engine 390 (FIGS. 3-4), and/or machine learning architecture 350 (FIGS. 3-4). The processing module(s) can be similar or identical to the processing module(s) described above with respect to computer system 100 (FIG. 1).

In many embodiments, method 900 can comprise an activity 910 of providing a search engine that includes, or communicates with, a machine learning architecture configured assist the search engine with sorting or ordering search results for items based, at least in part, on personalization preferences of users.

Method 900 can further comprise an activity 920 of generating attribute affinity scores for one or more attributes that predict a user's affinity for attribute values associated with the one or more attributes.

Method 900 can further comprise an activity 930 of generating an importance score for each of the one or more attributes that predicts an importance of each of the one or more attributes to the user.

Method 900 can further comprise an activity 940 of generating, using the search engine, personalized search results that are ordered based, at least in part, on the attribute affinity scores and attribute importance scores.

As evidenced by the disclosure herein, the techniques set forth in this disclosure are rooted in computer technologies that overcome existing problems in known search engines, including problems dealing with providing relevant search results in response to generic queries. The techniques described in this disclosure provide a technical solution (e.g., one that utilizes various machine learning techniques) for overcoming the limitations associated with known techniques. For example, the recall set selection and search result ranking techniques described herein take advantage of novel machine learning techniques to learn functions for personalizing search results.

In certain embodiments, the techniques described herein can advantageously improve user experiences with electronic platforms by quickly identifying personalized search results with high relevancy. In various embodiments, the techniques described herein can be executed dynamically in real time by an electronic platform. In many embodiments, the techniques described herein can be used continuously at a scale that cannot be reasonably performed using manual techniques or the human mind (e.g., due to the large numbers of users and items, and complex operations executed by the machine learning architecture). The data analyzed by the machine learning techniques described herein can be too large to be analyzed using manual techniques.

Furthermore, in a number of embodiments, the techniques described herein can solve a technical problem that arises only within the realm of computer networks, because machine learning does not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 8-9 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, perform functions comprising:
providing a search engine comprising, or communicating with, a recall personalization model configured to generate personalized recall sets of search results for users;
receiving, at the search engine, a generic search query submitted by a user, wherein the generic search query comprises less than three attribute descriptors;
generating, using the recall personalization model, a feature vector for the user comprising contextual features associated with the user, wherein each contextual feature of the contextual features reflects a respective user preference of personalization preferences associated with the user;
generating, using the recall personalization model, a simulated narrowing query that supplements the generic search query submitted by the user with the feature vector for the user comprising the contextual features; and
generating, using the search engine, a recall set of the search results based, at least in part, on the simulated narrowing query, wherein the recall set of the search results accounts for the personalization preferences associated with the user.

2. The system of claim 1, wherein:
the generic search query identifies an item type category without additional descriptors;
the search engine further supplements the generic search query with the contextual features; and
the contextual features enable the search engine to customize the recall set of the search results based, at least in part, on the personalization preferences associated with the user.

3. The system of claim 1, wherein generating the feature vector for the user comprising the contextual features further comprises:
appending the feature vector with one or more attribute keys associated with a brand attribute.

4. The system of claim 3, wherein generating the feature vector for the user comprising the contextual features further comprises:
appending the feature vector with one or more attribute keys associated with a flavor attribute; and
appending the feature vector with one or more attribute keys associated with a price band attribute.

5. The system of claim 1, wherein the recall personalization model comprises:
an attribute selection component that is configured to determine a number of attribute keys to be incorporated into the feature vector comprising the contextual features associated with the user; and
a machine learning architecture configured to convert the generic search query into the simulated narrowing query to account for the personalization preferences associated with the user, wherein the contextual features are derived from historical data associated with the user.

6. The system of claim 5, wherein the attribute selection component comprises a statistical model that is configured to determine the number of attribute keys to be incorporated into the feature vector for the user.

7. The system of claim 6, wherein the statistical model selects the number of attribute keys based, at least in part, on a number of the personalization preferences for the user.

8. The system of claim 6, wherein the statistical model selects the number of attribute keys based, at least in part, on preference scores associated with attribute values of the attribute keys.

9. The system of claim 1, wherein:
a plurality of attribute keys are pre-computed for the user;
each of the plurality of attribute keys comprises a respective attribute value and a respective preference score;
the respective preference score indicates a respective affinity of the user for the respective attribute value; and
the plurality of attribute keys are incorporated into the feature vector for the user.

10. The system of claim 1, wherein:
the search engine is configured to communicate with a personalized ranking model; and
the personalized ranking model is configured to sort the recall set of the search results based on the personalization preferences associated with the user.

11. A method implemented via execution of computing instructions configured to run at one or more processors and stored at non-transitory computer-readable media, the method comprising:
providing a search engine comprising, or communicating with, a recall personalization model configured to generate personalized recall sets of search results for users;
receiving, at the search engine, a generic search query submitted by a user, wherein the generic search query comprises less than three attribute descriptors;
generating, using the recall personalization model, a feature vector for the user comprising contextual features associated with the user, wherein each contextual feature of the contextual features reflects a respective user preference of personalization preferences associated with the user;
generating, using the recall personalization model, a simulated narrowing query that supplements the generic search query submitted by the user with the feature vector for the user comprising the contextual features; and
generating, using the search engine, a recall set of the search results based, at least in part, on the simulated narrowing query, wherein the recall set of the search results accounts for the personalization preferences associated with the user.

12. The method of claim 11, wherein:
the generic search query identifies an item type category without additional descriptors;
the search engine further supplements the generic search query with the contextual features; and
the contextual features enable the search engine to customize the recall set of the search results based, at least in part, on the personalization preferences associated with the user.

13. The method of claim 11, wherein generating the feature vector for the user comprising the contextual features further comprises:
appending the feature vector with one or more attribute keys associated with a brand attribute.

14. The method of claim 13, wherein generating the feature vector for the user comprising the contextual features further comprises:
appending the feature vector with one or more attribute keys associated with a flavor attribute; and
appending the feature vector with one or more attribute keys associated with a price band attribute.

15. The method of claim 11, wherein the recall personalization model comprises:
an attribute selection component that is configured to determine a number of attribute keys to be incorporated into the feature vector comprising the contextual features associated with the user; and
a machine learning architecture configured to convert the generic search query into the simulated narrowing query to account for the personalization preferences associated with the user, wherein the contextual features are derived from historical data associated with the user.

16. The method of claim 15, wherein the attribute selection component comprises a statistical model that is configured to determine the number of attribute keys to be incorporated into the feature vector for the user.

17. The method of claim 16, wherein the statistical model selects the number of attribute keys based, at least in part, on a number of the personalization preferences for the user.

18. The method of claim 16, wherein the statistical model selects the number of attribute keys based, at least in part, on preference scores associated with attribute values of the attribute keys.

19. The method of claim 11, wherein:
a plurality of attribute keys are pre-computed for the user;
each of the plurality of attribute keys comprises a respective attribute value and a respective preference score;
the respective preference score indicates a respective affinity of the user for the respective attribute value; and
the plurality of attribute keys are incorporated into the feature vector for the user.

20. The method of claim 11, wherein:
the search engine is configured to communicate with a personalized ranking model; and
the personalized ranking model is configured to sort the recall set of the search results based on the personalization preferences associated with the user.

* * * * *